Figure 1:
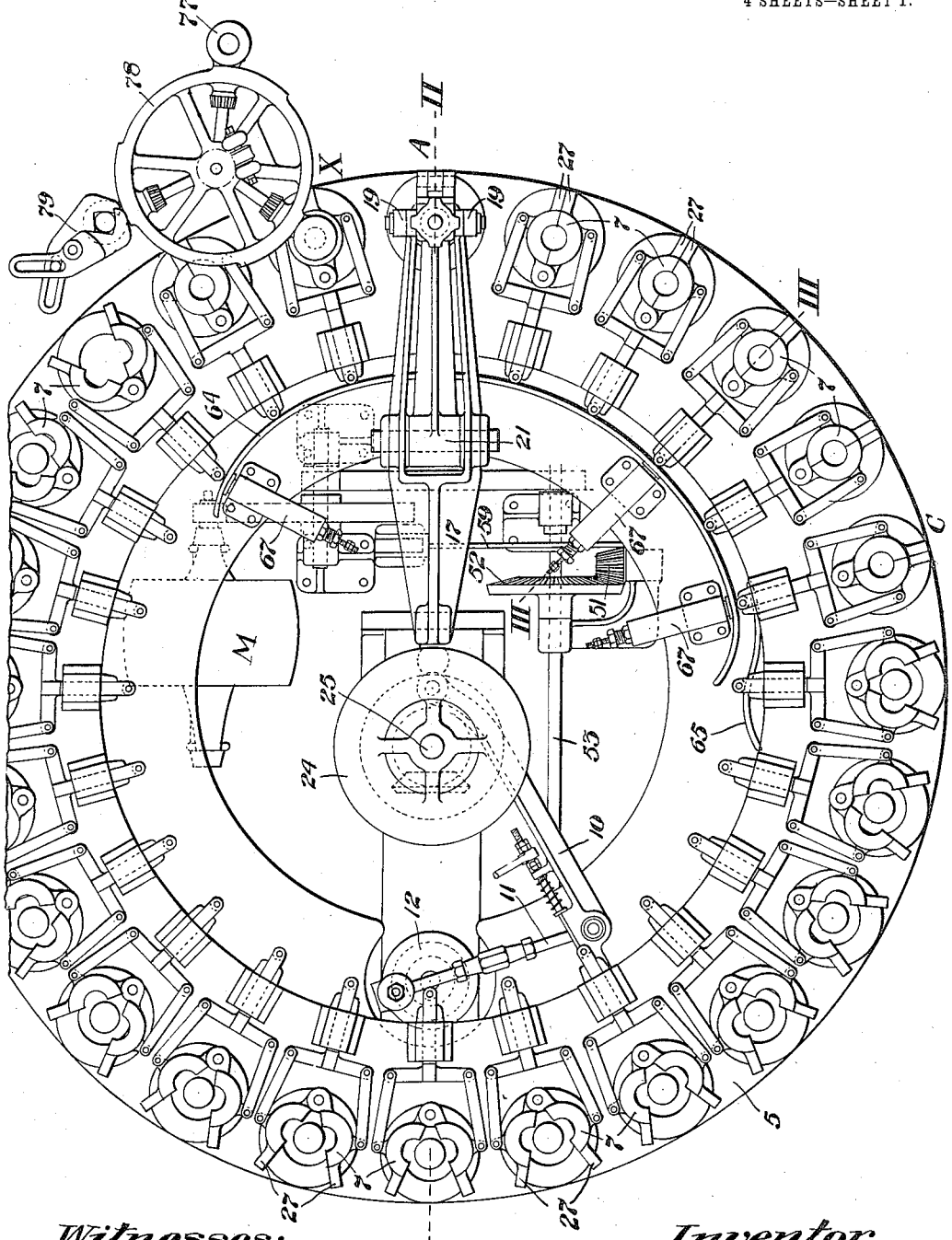

No. 840,994. PATENTED JAN. 8, 1907.
J. H. CROSKEY.
APPARATUS FOR MANUFACTURING GLASS ARTICLES.
APPLICATION FILED MAY 31, 1906.

4 SHEETS—SHEET 1.

Witnesses:
E. R. Rodd.
Chas. S. Epley.

Inventor:
John H. Croskey
by C. M. Clarke
his atty.

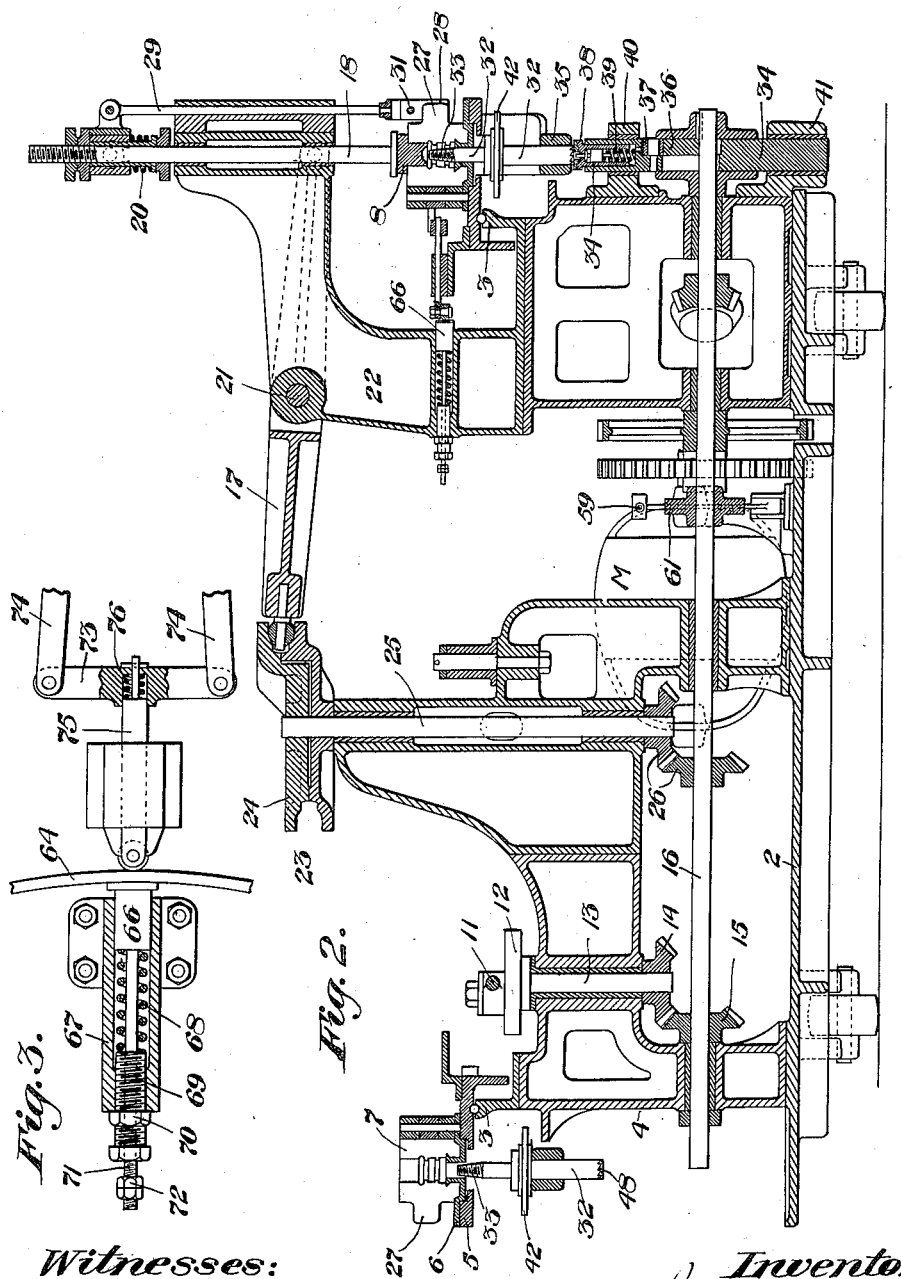

No. 840,994. PATENTED JAN. 8, 1907.
J. H. CROSKEY.
APPARATUS FOR MANUFACTURING GLASS ARTICLES.
APPLICATION FILED MAY 31, 1906.
4 SHEETS—SHEET 3.
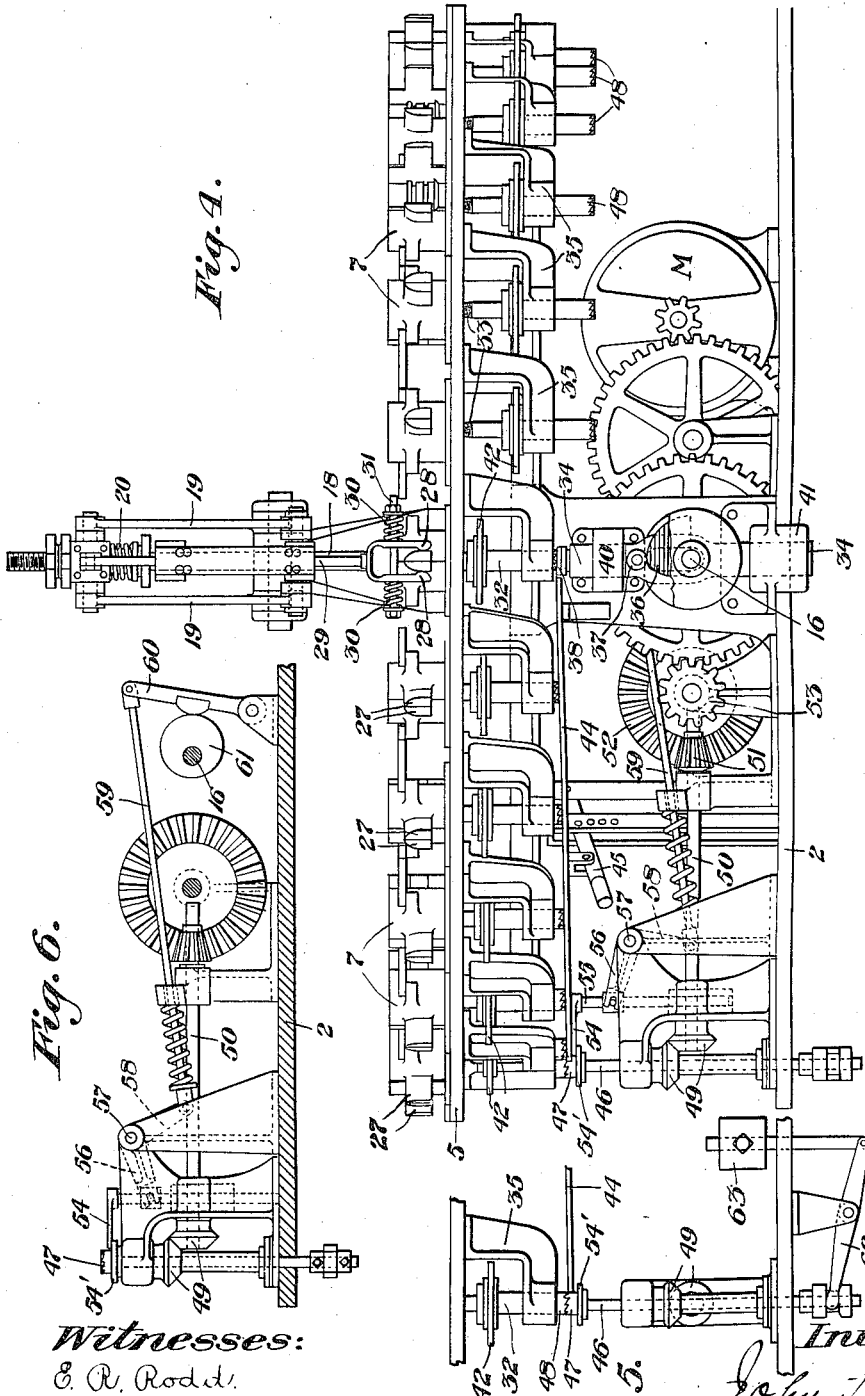
Witnesses:
E. R. Rodd.
Chas. S. Epley.
Inventor:
John H. Croskey
by C. M. Clarke
his attorney

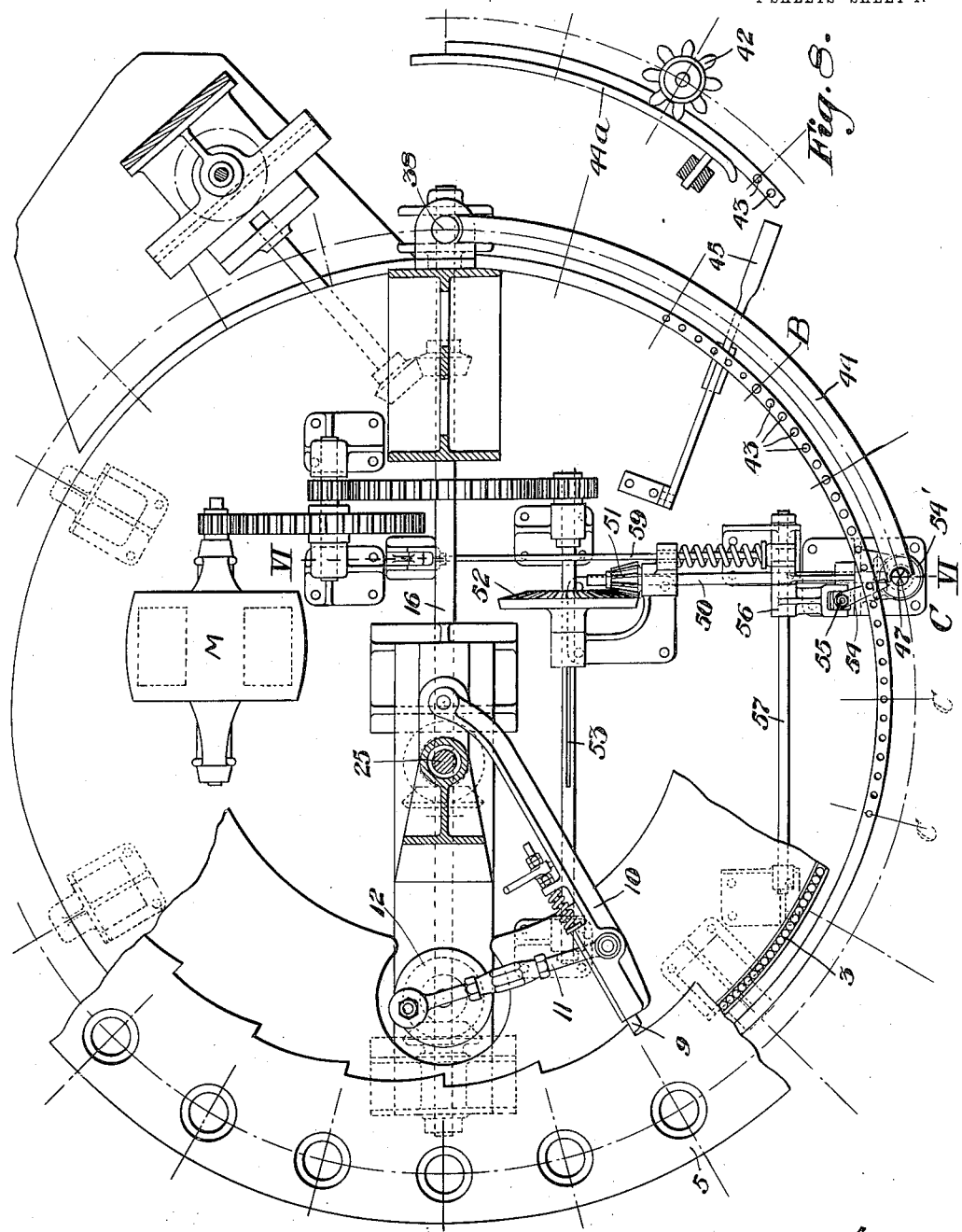

UNITED STATES PATENT OFFICE.

JOHN H. CROSKEY, OF PITTSBURG, PENNSYLVANIA, ASSIGNOR TO DUQUESNE GLASS CO., OF PITTSBURG, PENNSYLVANIA, A CORPORATION OF PENNSYLVANIA.

APPARATUS FOR MANUFACTURING GLASS ARTICLES.

No. 840,994.  Specification of Letters Patent.  Patented Jan. 8, 1907.

Application filed May 31, 1906. Serial No. 319,493.

To all whom it may concern:

Be it known that I, JOHN H. CROSKEY, a citizen of the United States, residing at Pittsburg, in the county of Allegheny and State of Pennsylvania, have invented certain new and useful Improvements in Apparatus for Manufacturing Glass Articles, of which the following is a specification, reference being had therein to the accompanying drawings.

My invention refers to improvements in apparatus for forming articles from material of a plastic nature, as glass, and the apparatus shown and hereinafter described is particularly designed for the manufacture of insulators for telegraph or other wires.

The invention is also applicable to the manufacture of any similar articles; and it has for its objects to simplify the operation, cheapen the output, and generally to improve mechanism of the same general character.

The subject of the present invention constitutes an improvement in that type of apparatus shown and described in my prior patent, No. 820,477, dated May 15, 1906, and comprises generally an intermittently-rotatable table carrying a concentric series of molds adapted to receive the glass and to cooperate with one or more reciprocating plungers operable within each mold successively, together with mechanism for opening and closing the molds, actuating the plunger or plungers, and for carrying out various necessary functions or movements of the machine, as shall be more fully hereinafter described.

In the present apparatus I have provided means for charging the molds, which, however, per se is not necessarily included in the apparatus herein claimed, but constitutes the subject-matter of a companion application; also, means for moving the mold successively into alinement with the plunger, means for locking the mold during the pressing operation, means for reversing the thread-forming plunger and for lowering it, means for opening the molds, &c.

Referring now to the drawings, wherein the invention is illustrated, Figure 1 is a plan view of the apparatus entire. Fig. 2 is a longitudinal vertical section on the line II II of Fig. 1. Fig. 3 is a horizontal sectional view through the cam-supporting and mold-lever mechanism indicated by the line III III of Fig. 1. Fig. 4 is a view in front elevation. Fig. 5 is a detail view of a portion of the construction at the left side of Fig. 4, showing the counterweighted plunger rotating and depressing mechanism. Fig. 6 is a sectional detail view indicated by the line VI VI of Fig. 7 looking toward the left. Fig. 7 is a sectional plan view, upper portions of the structure having been broken away and the molds removed from the rotating table. Fig. 8 is a detail view showing the means for holding the threaded socket-spindle stationary before engaging the rotating pins.

In the drawings, 2 represents any suitable base upon which the structure and operative elements comprising my invention are mounted, which base may be provided with supporting casters or wheels, as shown, or may be built upon any stationary supporting-foundation.

3 is a ball-race mounted upon the structural framework 4, provided with an annular groove adapted to support a series of bearing-balls, as shown, upon which balls or equivalent rollers rests a turn-table 5, adapted to support and carry the molds and the thread-forming spindles. These molds may be of any desired construction, according to the article to be formed, and the mold illustrated and designed is of well-known construction for the formation of insulators, comprising a base-mold 6, upon which are mounted the hinged sides of divided molds 7. These molds are arranged to be intermittently rotated around upon the carrier or table 5, so as to bring each mold beneath a pressing-plunger 8 at the proper place and time. The table 5 is intermittently actuated by means of a spring-controlled pawl or latch 9, mounted in the outer end of the swinging arm 10, actuated by pitman 11 from crank-disk 12 on the upper end of shaft 13, driven by gearing 14 and 15 from main shaft 16.

The operation of this construction will be readily understood from Figs. 2 and 7, it being understood that the plunger is designed to be actuated during each period of rest occurring during back travel of pawl 9. The plunger 8 is also reciprocating and pressed downwardly into the mold 7 by means of the lever 17, connected with the stem 18 of plunger 8 by suitable links 19 and any convenient intervening cushioning device, as a spring 20. Lever 17 is pivoted at 21 in the upper frame 22, which frame also provides a bearing for the plunger-rod, the lever extending backwardly and engaging by a terminal roller with the groove 23 of a cam 24, preferably made in two parts for convenience of manufacture, mounted on the upper end of the vertical shaft 25 and driven through gearing 26 from main shaft 16, as clearly shown in Fig. 2.

For the purpose of providing means for holding the sides of the mold 7 tightly together druing the pressing operation the molds are provided with outwardly-extending lugs 27, tapered at their upper portion and adapted to be embraced by a fork depending from the lower end of a rod 29, secured at its upper portion to the reciprocating plunger-actuating mechanism, as shown in Figs. 2 and 4. The sides 28 of the fork are designed to have sufficient lateral movement to spring over the tapered upper portions of lugs 27, and for the purpose of exerting inward spring-pressure I provide springs 30, mounted on a rod 31, which may be threaded at one or both ends, whereby the pressure of springs 30 and the resulting gripping effect of the fork-arms may be accurately regulated. The exterior portions of the insulator or other article are entirely formed by molds 6 and 7 and plunger 8, and where the article to be made is capable of being formed by a single plunger, as in case of deadeyes, cups, or other similar articles, no other apparatus will be necessary. When designed for making insulators, however, I provide means for forming an internally-threaded cavity, for which purpose I employ a vertically-reciprocating under plunger 32, having a threaded terminal 33. Each of these plungers is mounted by its lower stem in a supporting-frame 35, depending downwardly below the turn-table 5, and is designed to be raised upwardly within the mold-cavity at the pressing position A simultaneously with the downward travel of plunger 8.

Each spindle 32 carrying the threaded plunger is raised, as stated, by means of a vertically-reciprocating independent spindle 34, which in turn is raised by a wiping-cam 36, mounted or secured upon a disk at the outer end of shaft 16 and bearing underneath a roller 37. The upper portion of spindle 34 is provided with a bearing-terminal 38, mounted within the upper end of the spindle upon a cushioning-spring 39, as clearly shown in Fig. 2, the spindle being conveniently mounted in upper and lower guiding-bearings 40 41. The wiper-cam 35 is so designed and arranged that it will gradually raise the lifting-stem 34, which abuts against the lower end of plunger-spindle 32, raising it to the desired height within the mold-cavity. The table then carries the mold and spindle around until its lower end rests upon the inclined slide or plate 44, and the wiper-cam 35 then quickly releases the stem by riding beyond the bearing-roller 37, allowing the cam-spindle 34 to suddenly drop to its lowermost position. The article is formed around the threaded plunger 32 in its raised position within the mold under its pressure, resulting in the finished insulator.

For the purpose of allowing the glass article to partially cool before commencing the reverse rotation of the threaded plunger no reverse rotation is imparted to it until the mold has been carried around to an advanced position B. For the purpose of holding the threaded plungers against rotation during the cooling period I provide a curved bearing-bar 44$^a$, Fig. 8, mounted in any suitable supports, against which the teeth of star-wheels 42 will bear, the end of said bar terminating immediately in front of the pins 43. The threaded plunger is then slowly rotated to unscrew it from the article, for which purpose each spindle 34 is provided with a star or toothed wheel 42, which engages a series of stationary pins or rack-abutments 43 upon further rotation of the table, causing the spindle to be rotated, and consequently to travel in a downward direction during such rotation away from engagement with the threaded insulator still in the mold. During such intermittent travel of the molds the spindles 32 in their raised position are supported upon the upper face of an annularly-arranged inclined slide 44, capable of vertical adjustment by means of lever mechanism 45 and so adjusted as to correspond with the desired lowering travel of the spindles as rotated. The slow rotation of the spindles continues until the molds arrive at the position C, at which point the threaded terminal of each spindle has become almost entirely freed from engagement with the article, and the spindle is then rapidly rotated, still in a reverse direction, by means of stationary spindle 46, having a toothed terminal 47 arranged to engage the correspondingly-toothd terminal 48 of each spindle 34, lowering it entirely from the mold.

Spindle 46 is rotated by means of gearing 49 from counter-shaft 50, driven through bevel-gearing 51 52 from counter-shaft 53, actuated through suitable gearing from the main shaft 16. To effect such quick lowering of the threaded spindle entirely away from its partial engagement with the finished article, the spindle 46 during its rotation is lowered by means of a finger 54 engaging flange 54', mounted on the upper end of stem 55 and actuated by lever 56, adjustably mounted on shaft 57 by a key or set-screw lever 58 and spring-retracted rod 59, connected with arm 60, said arm being pressed backwardly at the proper time by means of cam 61, mounted on shaft 16. Spindle 46 is returned to its normal raised position by means of pivoted lever 62 and counterweight 63, as clearly shown in Figs. 5 and 6, thus automatically resuming its raised position after having been lowered away from the under side of each spindle 34 at position C. When it is desired to rotate the turn-table without using the lower threaded plungers 32, the inclined bearing-plate 44 may be lowered entirely below the normal level of the bottoms of the spindles, as at the right of Fig. 4. The terminal of slide 44 projects over and also engages flange 54', thus lowering the unscrewing-spindle 46 below the path of the plungers to provide clearance.

For the purpose of varying the position C bevel-wheel 52 is in spline or set-screw engagement with shaft 53, and said shaft and also shaft 57 are of sufficient length to permit of sliding the bevel-gearing and its frame and also the lever 56 along said shafts to the next adjacent position or beyond, (indicated by the dotted lines C and C,) as will be readily understood.

For the purpose of closing and opening the molds at the proper time I employ cams 64 and 65, Figs. 1 and 3, of the same general construction and mode of operation as shown in my prior patent above referred to, and it is designed that each mold shall be opened immediately beyond the position C, allowing of the removal of the finished article by hand or any suitable mechanism. The cam-bar 64 is carried upon the outer ends of studs 66, slidingly mounted in bearings 67 and normally pressed outwardly by springs 68. The pressure of the springs may be accurately regulated by the threaded bolt 69 and lock-nut 70, while the outward normal limit of position of the cam-bar is controlled by stem 71, passing through the bolt 69 and provided with a terminal nut 72. By this means the cam-bar is cushioned to provide sufficient resiliency to prevent breakage should anything occur to prevent closing of the molds. Likewise in order to cushion the mold-arms the cross-bar 73, connected with the molds by links 74 74, is cushioned against the cam-bearing stud 75 by means of an intervening spring 76, as clearly shown in Fig. 3.

The entire apparatus is actuated from any suitable prime mover, which may be electric motor M, from which power is distributed through suitable gearing and shafting, as shown, and the speed of operation may be suitably regulated to conform to the work in view.

In the drawings I have shown mechanism for charging a measured quantity of glass into the molds by means of cups 77, mounted in an intermittently-rotating frame 78, arranged to coöperate with shear mechanism 79, adapted to admit the charge of the glass when open and to shear off the desired amount. The cups are adapted to receive an approximately exact amount of glass in an upright position and to empty the glass into each mold at the proper time and place by a half-rotation of the mold. This construction, however, forms the subject-matter of the companion application filed herewith, and it will be understood that the molds may be filled by any other suitable means.

The operation will be readily understood from the foregoing description. Each mold is intermittently brought around to the filling position X, then brought into register with the plunger mechanism, when the article is pressed into shape, the molds then traveling around until the screw-spindle of each is slowly unscrewed from the hardened ware, the threaded spindle then being entirely removed at the position C and the articles being removed immediately after from the opened molds. The operation is carried on continuously and automatically, resulting in great uniformity of product, simplicity of operation, and a high percentage of perfect goods.

It will be understood that the machine may be variously adapted for different shapes or may be greatly changed or varied in different details within the judgment of the skilled mechanic; but all such changes are to be considered as within the scope of the following claims.

What I claim is—

1. Apparatus for forming articles of glassware consisting of a rotatable mold-carrier provided with a circularly-arranged series of molds, a pressing-plunger arranged to coöperate with each of said molds successively, a series of oppositely-disposed threaded plungers mounted in the mold-carrier, independent plunger-raising mechanism, means for partially unscrewing the threaded plungers during rotation of the mold-carrier, and means for entirely removing the threaded plungers while the mold-carrier is stationary, substantially as set forth.

2. Apparatus for forming articles of glassware consisting of a rotatable mold-carrier provided with a circularly-arranged series of divided molds having locking-lugs, a pressing-plunger arranged to coöperate with each of said molds successively, and means for simultaneously engaging the locking-lugs, substantially as set forth.

3. The combination with a divided mold having locking-lugs; of plunger mechanism and means connected therewith for simultaneously engaging the locking-lugs to hold the sides of the mold together during the pressing operation, substantially as set forth.

4. The combination with a glass-mold composed of pivotally-connected sides and having locking-lugs; of pressing mechanism, and a resilient fork connected therewith arranged to embrace the locking-lugs, substantially as set forth.

5. The combination with a glass-mold composed of pivotally-connected sides and having locking-lugs; of pressing mechanism, a fork composed of resilient embracing sides, and means for exerting inward pressure thereon, substantially as set forth.

6. The combination with a mold composed of pivoted sides and having locking-lugs; of a reciprocating plunger arranged to coöperate with the mold, and a fork connected with the plunger mechanism having spring-pressed terminals adapted to embrace the locking-lugs to hold the sides of the mold in closed position, substantially as set forth.

7. An apparatus for forming articles of glassware, the combination with a vertically-movable rotating plunger-actuating spindle, of a bevel-wheel slidingly engaging the spindle, a shaft provided with a bevel-wheel engaging said bevel, means for driving said shaft, a vertically-movable stem having a finger engaging the spindle, a pivoted lever engaging said vertically-movable spindle, a cam and coöperating mechanism arranged to actuate said lever in one direction, a retracting-spring arranged to actuate the lever in the opposite direction, and an inclined slide-bar projecting over the top of the plunger-actuating spindle and arranged to deliver the mold-spindles thereon, substantially as set forth.

8. The combination with a vertically-movable rotating plunger-actuating spindle, of gearing arranged to rotate the spindle, lever mechanism arranged to lower the spindle, and supporting-shafts for portions of the gearing and lever mechanism arranged to receive and impart motion to said elements at varying positions on the shafts, substantially as set forth.

9. The combination with a vertically-movable rotating plunger-actuating stem, of a bevel-wheel engaging the spindle, a shaft provided with a bevel-wheel at one end engaging said bevel, laterally-adjustable means for driving said shaft, a vertically-movable stem having a finger engaging the first-named stem and provided with a collar, a laterally-adjustable bell-crank lever engaging said collar, cam mechanism arranged to actuate said lever, and a counterweighted lever arranged to raise the spindle, substantially as set forth.

10. In an apparatus of the class described, the combination with a vertically-movable unscrewing-spindle having a flange and arranged to make lowering engagement underneath each of a series of annularly-traveling spindles, of an annularly-arranged spindle-supporting slide providing a bearing for said spindles projecting over said flange and making an embracing engagement with said spindle.

11. The combination with a plunger provided with an actuating star-wheel, of a slide arranged to provide a bearing for the teeth of said star-wheel to prevent rotation, substantially as set forth.

12. In apparatus for forming articles of glassware having a circular table provided with a circularly-arranged series of molds; a mold-closing cam arranged concentric to the center of said table and provided with resiliently-mounted supporting devices arranged on the same level therewith and extending radially backward toward the center of the table, substantially as set forth.

13. In apparatus for forming articles of glassware having a circular table provided with a circularly-arranged series of molds; a mold-closing cam arranged concentric to the center of said table and provided with backwardly-extending supporting-arms, casings for said arms, and springs mounted in said casings providing resilient backing arranged to oppose pressure against the opposite face of the cam, substantially as set forth.

14. In apparatus for forming articles of glassware having a circular table provided with a circularly-arranged series of molds, a mold-closing cam arranged concentric to the center of said table and provided with resiliently-mounted supporting devices arranged back of said cam on the same horizontal level therewith and having adjustable means for limiting outward travel of the cam, substantially as set forth.

15. In apparatus for forming articles of glassware provided with a rotatable table having a circularly-arranged series of molds, each of said molds having cam-actuated closing mechanism; an annularly-arranged cam substantially concentric with the center of said table adapted to actuate the mold-closing mechanism, resiliently-mounted supporting devices arranged back of said cam on the same horizontal level therewith, and resilient cushioning devices incorporated in said mold-closing mechanism, substantially as set forth.

16. In a machine of the class described, the combination with a vertically-movable rotating plunger-actuating spindle, of a lever-shaft and a power-shaft, lever mechanism arranged to lower the spindle slidingly mounted on the lever-shaft, gearing and framing therefor slidingly mounted on the power-shaft and in driving engagement with the spindle, and cam-actuated mechanism arranged to tilt the lever-shaft, substantially as set forth.

In testimony whereof I affix my signature in presence of two witnesses.

JOHN H. CROSKEY.

Witnesses:
 CHAS. S. LEPLEY,
 C. M. CLARKE.